March 4, 1969   K. G. THORSTED ET AL   3,430,487

PROPELLANT SPIN EVALUATION APPARATUS

Filed July 10, 1967

INVENTORS.
KENNETH G. THORSTED
LOUIS C. RENNER
JOSEPH A. SCHMIDT
BY
  V. C. MULLER
  ROY MILLER
ATTORNEYS.

...

United States Patent Office 3,430,487
Patented Mar. 4, 1969

3,430,487
PROPELLANT SPIN EVALUATION APPARATUS
Kenneth G. Thorsted and Louis C. Renner, China Lake, and Joseph A. Schmidt, Ridgecrest, Calif., assignors to the United States of America as represented by the Secretary of the Navy
Filed July 10, 1967, Ser. No. 652,660
U.S. Cl. 73—117.4      4 Claims
Int. Cl. G01m 15/00

ABSTRACT OF THE DISCLOSURE

Thrust of solid propellant motor is measured while spinning about its axis, providing information pertaining to the effects of spin speed on grain support, inhibiting problems, and general motor performance.

---

The invention described herein may be manufactured and used by or for the Government of the United States of America for governmental purposes without the payment of any royalties thereon or therefor.

In the prior art it has been conventional practice to measure thrust of spin type rocket thrust motors while stationary. Since this technique did not simulate actual conditions of operation of such motors, the results were inconclusive since they failed to involve forces and other factors which have effects on thrust and structural characteristics of the motors while under actual spin conditions.

The principal object of this invention is to provide thrust motor test apparatus which measures thrust while the motor is spinning at a desired speed.

Another object is to provide apparatus of the foregoing type which may be constructed economically from readily available components.

Figure 1:
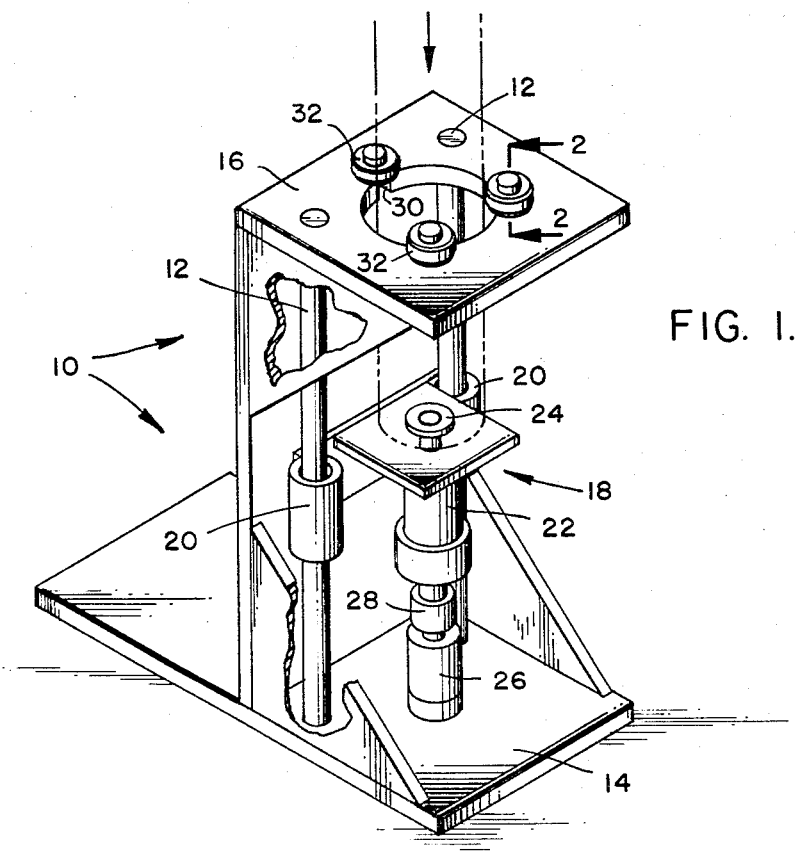
Figure 2:
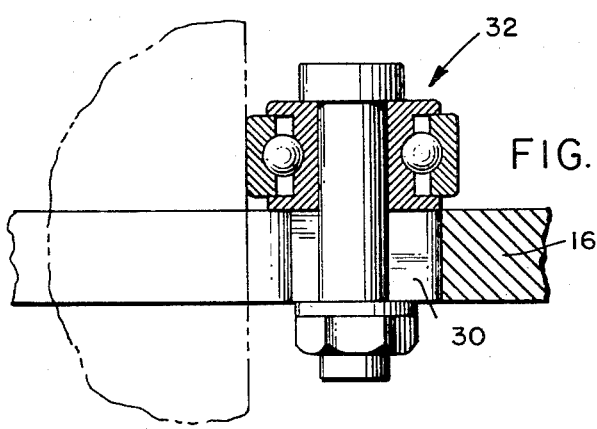

Still further objects, advantages and salient features will become apparent from the description to follow, the appended claims, and the accompanying drawing, in which:

FIG. 1 is an isometric of the subject of the invention;
FIG. 2 is an enlarged section taken on line 2—2, FIG. 1; and
FIG. 3 diagrammatically illustrates an electrical system.

Referring now to the drawing, the subject of the invention comprises a frame or stand 10 which supports a pair of parallel guide rods 12, 12, secured at their lower ends to a plate 14 and at their upper ends to a plate 16. A carriage 18 is supported on the guide rods by linear antifriction ball bearings 20, 20 of conventional design. A variable speed electric motor 22 is rigidly affixed to the carriage, the upper end of its armature shaft having a suitable adapter 24, which may be secured to the thrust motor under test (shown in phantom). A thrust cell 26 is affixed to lower plate 14 and a live center 28 is interposed between the lower end of the armature shaft and thrust cell. The top plate is provided with three radial slots 30, one of which is illustrated in FIG. 2, which provide radial adjustments for ball bearings 32 which engage the periphery of the thrust motor and steady it for rotation about its axis.

Figure 3:
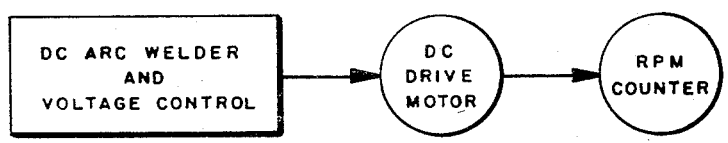

FIG. 3 illustrates a simplified power source which utilizes a D.C. arc welder and a D.C. drive motor, the arc welder voltage controls being employed to control the motor speed. Any type of electrical or mechanical r.p.m. counter may be associated with the drive motor armature shaft to determine its speed.

In the operation of the apparatus, one end of a rocket thrust motor is secured to adapter 24 so that it rotates about its axis. Ball bearings 32 are then radially adjusted and secured in position to provide lateral support of the rocket motor. It is then spun at desired speed by adjustment of the voltage control and observation of the r.p.m. counter and is then ignited, its thrust being transmitted to the thrust cell which provides signals for recording the thrust on an oscillograph or other recording apparatus.

Obviously many modifications and variations of the present invention are possible in the light of the above teachings. It is therefore to be understood that within the scope of the appended claims the invention may be practiced otherwise than as specifically described.

What is claimed is:
1. Apparatus for measuring thrust of a rocket motor while spinning about its longitudinal axis, comprising;
 (a) a frame,
 (b) a variable speed electric drive motor,
 (c) means supporting the drive motor for rectilinear movement relative to the frame, the motor having an armature shaft,
 (d) means for connecting one end of the armature shaft of the drive motor to one end of a rocket motor,
 (e) at least three angularly spaced anti-friction bearings carried by the frame and engageable with the periphery of the rocket motor at a position between its ends for restraining the rocket motor to rotate about its longitudinal axis, and
 (f) means for measuring the thrust of the rocket motor transmitted to said armature shaft.
2. Apparatus in accordance with claim 1 wherein a live center is interposed between the other end of said shaft and said means for measuring the thrust.
3. Apparatus in accordance with claim 1 wherein said motor is of the D.C. type, and a D.C. arc welder and its voltage controls for providing the power source for the drive motor.
4. Apparatus for measuring thrust of a rocket motor while spinning about its axis, comprising;
 (a) a frame,
 (b) a pair of parallel vertically extending guide rods carried by the frame,
 (c) a carriage supported by the guide rods for rectilinear movement relative thereto,
 (d) a variable speed D.C. drive motor affixed to the carriage with the axis of its armature shaft disposed in a vertical position, said armature shaft having upper and lower ends,
 (e) means for connecting the upper end of said armature shaft to the lower end of the rocket motor,
 (f) a thrust cell affixed to the frame below the drive motor,
 (g) an anti-friction bearing interposed between the lower end of the armature shaft and the thrust cell, said anti-friction bearing having a stationary portion engaging the thrust cell,
 (h) at least three angularly spaced anti-friction bearings carried by the frame and engageable with the periphery of the rocket motor at a position between its ends for restraining the rocket motor to rotate about its vertical and longitudinal axis, and
 (i) a D.C. arc welder and its voltage controls for providing the power source for the drive motor.

References Cited

UNITED STATES PATENTS 2,655,033  10/1953  Burrell _____ 73—167 X
2,953,019  9/1960  Rosenberg _____ 73—117.4

RICHARD C. QUEISSER, Primary Examiner.

JERRY W. MYRACLE, Assistant Examiner.

U.S. Cl. X.R.
73—140